Jan. 20, 1959 R. O. DAVIS 2,869,739
APPARATUS FOR STACKING AND UNSTACKING BUILDING BLOCKS
Filed Nov. 10, 1954 7 Sheets-Sheet 1

INVENTOR.
ROBERT O. DAVIS
BY
SMITH, OLSEN & KOTTS
ATTORNEYS

Jan. 20, 1959   R. O. DAVIS   2,869,739
APPARATUS FOR STACKING AND UNSTACKING BUILDING BLOCKS
Filed Nov. 10, 1954   7 Sheets-Sheet 2

INVENTOR.
ROBERT O. DAVIS
BY
SMITH, OLSEN & KOTTS
ATTORNEYS

Jan. 20, 1959 R. O. DAVIS 2,869,739
APPARATUS FOR STACKING AND UNSTACKING BUILDING BLOCKS
Filed Nov. 10, 1954 7 Sheets-Sheet 5

INVENTOR.
ROBERT O. DAVIS
BY
SMITH, OLSEN & KOTTS
ATTORNEYS

Jan. 20, 1959 R. O. DAVIS 2,869,739
APPARATUS FOR STACKING AND UNSTACKING BUILDING BLOCKS
Filed Nov. 10, 1954 7 Sheets-Sheet 7

INVENTOR.
ROBERT O. DAVIS
BY
SMITH, OLSEN & KOTTS
ATTORNEYS

United States Patent Office 2,869,739
Patented Jan. 20, 1959

2,869,739

APPARATUS FOR STACKING AND UNSTACKING BUILDING BLOCKS

Robert O. Davis, Adrian, Mich., assignor to Gene Olsen Corporation, Adrian, Mich., a corporation of Michigan Application November 10, 1954, Serial No. 468,000

9 Claims. (Cl. 214—16.4)

This invention relates to a method and apparatus for stacking and unstacking building blocks at certain periods during their manufacture.

In the manufacture of building blocks the blocks are initially formed in molds and are subsequently heated in order to harden or, as it is usually termed, cure.

The molding of the blocks is preferably accomplished continuously and automatically in molding machines. In order to provide for continuous operation of the molding machines some means must be included for carrying blocks away from the molds as they are formed. This means usually takes the form of an endless chain conveyor on which are positioned a series of flat pallets. As each block is formed it is deposited on one of these pallets and moved out of the machine via the conveyor.

As stated earlier the blocks must be heated in order for them to harden or cure. Heating of the blocks is usually accomplished in autoclaves. The autoclaves must, of course, handle as many blocks as are formed in the molding machines. Otherwise the molding machines would need to be idled periodically in order for the autoclaves to keep pace with them. It has been found that, if the autoclaves are to handle and otherwise completely cure the required number of blocks, it is necessary to stack the blocks in vertically spaced layers within the autoclave, it being appreciated that maximum autoclave capacity requires that as much as possible of the autoclave volume be occupied by blocks. This presents the problem of how to remove the blocks from the molding machine conveyor and regroup them into vertically spaced layers.

In order to overcome this problem there is employed, according to the teachings of the present invention, a number of racks each having a series of vertically spaced decks for accommodating pallets of uncured blocks. A carriage is provided for transferring pallets and blocks from the molding machine conveyor to the various decks of each rack. The carriage is equipped with one or more lift arms for picking pallets of blocks from the conveyor and transferring them to the various decks of the racks. When a rack is completely loaded with blocks it is transferred to an autoclave.

After being heated for the necessary period in the autoclave the blocks must be stacked or stored until ready for shipment out of the block manufacturing plant. It is not feasible to store the cured blocks on the racks because, among other reasons, the cost of providing sufficient racks would be prohibitive. It is therefore necessary to remove the cured blocks from their racks after they have emerged from the autoclave.

According to one embodiment of the present invention means is provided for transferring cured blocks from a rack to an unloading conveyor. This embodiment of the invention is unique from the functional standpoint perhaps, in that the same mechanism which transfers cured blocks from the rack to the unloading conveyor also transfers uncured blocks from the molding machine conveyor to the rack.

According to another embodiment of the invention the cured blocks are removed from the rack in a separate operation, after which the rack (with the pallets still in position thereon) is transferred to a position in registry with the beforementioned carriage. The carriage then lifts pallets and uncured blocks from the molding machine conveyor and carries them toward the empty pallets on the rack. The pallets of uncured blocks are caused to displace the empty pallets on the rack, and the empty pallets are pushed off onto a conveyor which returns them to the molding machine.

In order that stacking and unstacking of the blocks may proceed in as continuous a manner as possible, and with a minimum of idle time of the molding machine, it is desirable that a rack be at all times in position for receiving blocks from the molding machine conveyor. In the present invention this is accomplished by providing a movable carrier member adjacent the discharge end of the molding machine conveyor. This carrier member supports a plurality of the block racks. As soon as one rack is loaded with uncured blocks the carrier member is moved so as to dispose another rack in position for receiving uncured blocks. While the second rack is being loaded with blocks the first rack is being removed from the carrier member and transferred to the autoclave.

The invention has a number of objects, the primary object being to provide a method and mechanism for automatically transferring molded blocks to and from stacked positions on racks before and after they have been cured in autoclaves.

Another object is to provide a method and mechanism for stacking blocks on a rack wherein the rack is automatically removed from loading position at completion of the stacking operation.

Another object is to provide a method and mechanism for stacking blocks on a rack wherein an empty rack is automatically moved into loading position as a loaded rack is being removed from loading position.

Another object is to provide a method and mechanism for stacking and unstacking blocks wherein the stacking and unstacking operations are performed simultaneously and by the same elements of the mechanism.

Another object of the invention is to provide a method and mechanism for transferring pallets of molded blocks to vertically spaced positions on a rack while at the same time discharging empty pallets from the rack.

Various other objects will be apparent as the following description proceeds.

In the drawings:

Figure 14 is a sectional view taken substantially on line

14—14 but with certain parts broken away to better show certain rollers 197 and 184 and track 183.

Referring more specifically to Figures 1 through 4 of the drawings it will be seen that a chain conveyor 10 has been provided. This conveyor moves in the direction of arrow A to carry pallets of uncured blocks away from a molding machine (not shown).

As the pallets are carried along on conveyor 10 they move into positions overlying a pair of arms 13 extending from a carriage 14 on opposite sides of conveyor 10. Carriage 14 is mounted for horizontal movement on an elevator 15 by means of tracks 11 and 12 fixed on respective ones of the carriage and elevator. This elevator is provided with a plurality of rollers 16 for its slidable movements on fixed vertical tracks 17.

Figure 1:
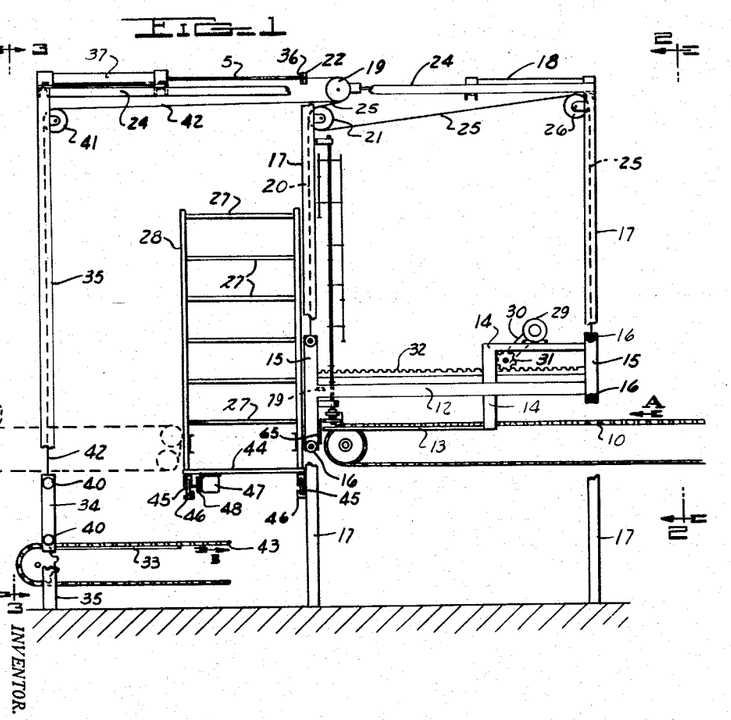
Figure 1 is a front elevational view of one embodiment of the invention.
Figure 2:
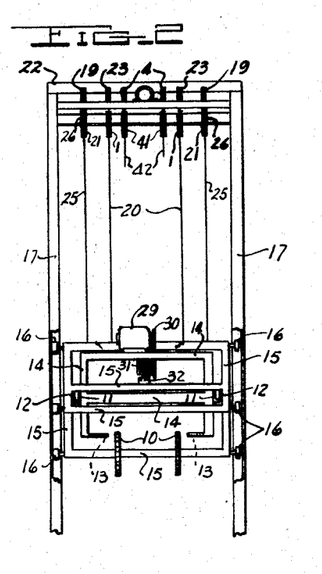
Figure 2 is an end elevational view taken in the direction of line 2—2 in Figure 1.
Figure 3:
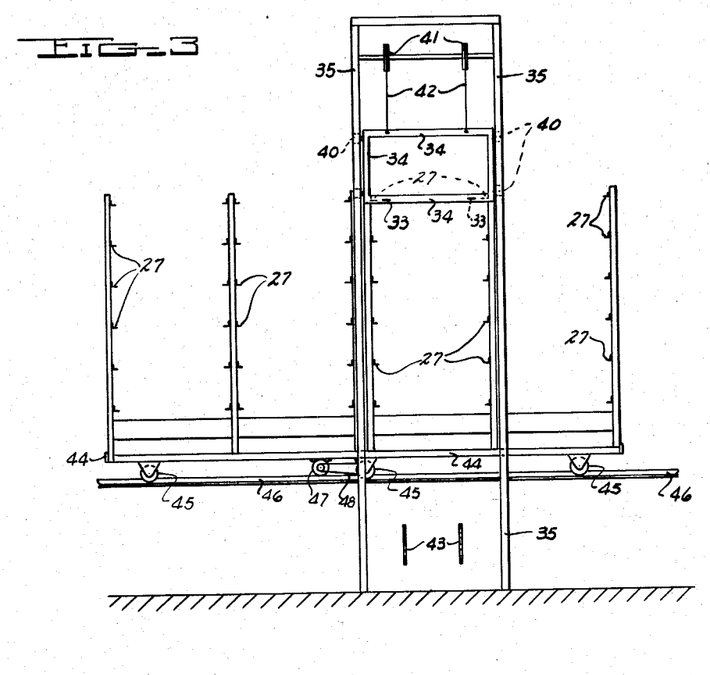
Figure 3 is an end elevational view taken in the direction of line 3—3 in Figure 1.
Figure 4:
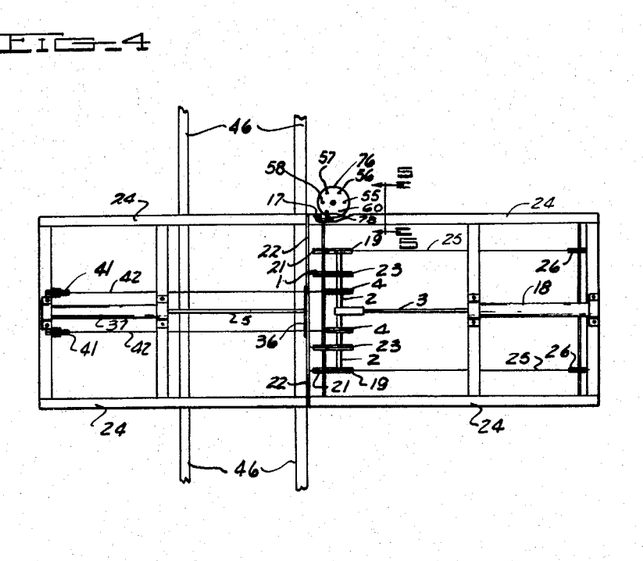
Figure 4 is a plan view of the embodiment shown in Figure 1.

The mechanism for raising the elevator on tracks 17 takes the form of a hydraulic cylinder 18, a series of pulleys 1, 19, 21, 23, 26 and a series of cables 20 and 25. Each of cables 20 and 25 is anchored at one of its ends on a cross bar 22 which is fixedly secured between two horizontal beams 24. Cables 25 run over pulleys 19, around pulleys 21, over to pulleys 26 and down to an anchorage on the right end of elevator 15 (Fig. 1). Cables 20 run over pulleys 23, around pulleys and down to an anchorage on the left end of elevator 15 (Fig. 1). Pulleys 19 and 23 are rotatably mounted on a shaft 2 which is secured on the left end of a piston rod 3. As will be seen in Figure 4 piston rod 3 extends from cylinder 18. Movement of piston rod 3 to the right (as seen in Figure 1) will cause a corresponding movement of shaft 2 and cables 20, 25 with a consequent raising of elevator 15.

It will be appreciated that raising of elevator 15 will cause arms 13 (formed on carriage 14) to move upwardly and lift the overlying pallets off of conveyor 10. When arms 13 have been raised a sufficient distance the lifted pallets will be in horizontal alignment with a pair of angle irons 27 provided on rack 28. Members 27 constitute one deck of the rack. Five other decks are provided on the rack.

An object of the invention is to transfer blocks from conveyor 10 to rack 28. In order to accomplish this object there is provided on carriage 14 a motor 29. This motor drives a belt 30 and thereby causes rotation of pinion gear 31. Gear 31 meshes with a toothed rack 32 fixedly secured on elevator 15. It will be appreciated that counterclockwise rotation of motor 29 (as it is viewed in Fig. 1) will, through the mechanism of belt 30 and rack-pinion means 32, 31, cause carriage 14 to move horizontally toward members 27 on rack 28.

As carriage 14 moves toward members 27 the leading edges of arms 13 will strike empty pallets which are resting on members 27. The pallets on members 27 will be pushed off members 27 into superimposed positions on a pair of arms 33 fixedly secured on an elevator 34, at which time the pallets on arms 13 will be moved into positions directly above members 27. By moving piston rod 3 slightly to the left it will be appreciated that the pallets on arms 13 can be lowered onto angle irons 27. Subsequently motor 29 can be rotated clockwise for causing carriage 14 to move away from rack 28 toward elevator 15, after which cylinder 18 can be moved further to the left to lower elevator 15 and carriage 14 to the Figure 1 position adjacent conveyor 10. If desired cylinder 18 and motor 29 can be actuated simultaneously, in which case carriage 14 will be moving toward elevator 15 as the elevator is being lowered toward conveyor 10.

When elevator 15 reaches the lower limit of its travel arms 13 will be in positions below conveyor 10 such that, when conveyor 10 is moved in the direction of arrow A pallets of uncured blocks will be carried into positions overlying the arms. Arms 13 can then repeat the previously described cycle of operations to load the remaining decks on rack 28 with pallets of uncured blocks.

It will be recalled that movement of arms 13 toward rack 28 causes pallets on the rack to be pushed onto a pair of arms 33. Arms 33 are fixedly secured on an elevator 34 which is mounted for vertical movement on a pair of tracks 35 by means of rollers 40. A pair of cables 42 leads from elevator 34 up over a pair of guide pulleys 41, laterally over and around a pair of guide pulleys 4 (rotatably mounted on shaft 2) and through a pair of apertures in bar 22 to an anchorage on a cross bar 36. Bar 36 is secured on the free end of a piston rod 5 which extends from a hydraulic cylinder 37. Since pulleys 4 are mounted on shaft 2 they will move with piston rod 3. It will be appreciated that movement of piston rod 3 will cause simultaneous movement of elevators 15 and 34 and that cylinder 37 will allow a further movement of elevator 34 relative to elevator 15. Therefore when elevator 15 is moving down toward conveyor 10 (after arms 13 have deposited pallets on rack 28) elevator 34 will be moving down toward a conveyor 43. Conveyor 43 runs in the direction of arrow B and functions to return empty pallets from elevator 34 to molding machine 11. In the particular installation illustrated in Figure 1 conveyor 43 is spaced below conveyor 10. Since cylinder 18 only allows elevator 34 to travel the same distance as elevator 15 hydraulic cylinder 37 must be provided for allowing elevator 34 to get down from the level of conveyor 10 to conveyor 43. The movements of cylinders 18 and 37 are such that when elevator 15 is moving down to position arms 13 beneath conveyor 10 elevator 34 is moving down to position arms 33 beneath conveyor 43. As arms 33 pass below conveyor 43 the pallets on said arms will be transferred onto conveyor 43. Movement of said conveyor in the direction of arrow B will cause the pallets to be carried away from vertical registry with arms 33 and toward molding machine 11.

As soon as rack 28 is loaded with pallets of uncured blocks it is necessary to move another rack into position to receive blocks from conveyor 10. There is therefor provided a carrier 44 having wheels 45 for its translatory movement along a pair of tracks 46. An electric motor 47 is provided for causing rotation of wheels 45 (through belt 48), thereby effecting the desired movement of carrier 44. Rack 28 is removably positioned on carrier 44. By reference to Figure 3 carrier 44 will be seen to be of sufficient length to accommodate four racks. For a purpose to be described later the two endmost racks are secured to the two intermediate racks to form in effect two double size racks.

The movements of carrier 44 and racks 28 whereby correct positioning of the racks is permitted may best be understood by reference to schematic Figures 8 through 11. For illustration purposes the four racks are numbered 28, 49, 50 and 51.

Figure 8:
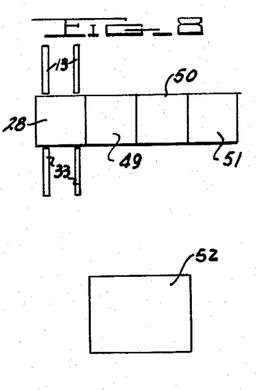
Figures 8 through 11 are diagrammatic views showing certain elements of the invention in positions they assume at different periods throughout the cycle of operations.

In the position of Figure 8 rack 28 will be in position for receiving pallets of uncured blocks from arms 13 and for discharging empty pallets onto arms 33. Racks 50 and 51 will be loaded with pallets of uncured blocks.

As the various decks of rack 28 are being loaded with pallets of uncured blocks, racks 50 and 51 will be transferred by lift truck from carrier 44 to a curing chamber 52 where the blocks are cured. Racks 50 and 51 are secured together so they may be transferred as a unit.

Figure 9:
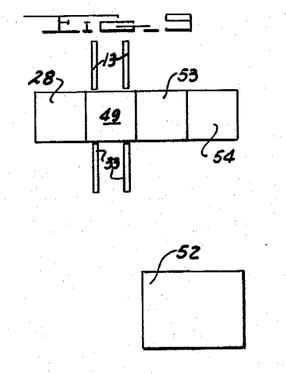

As soon as rack 28 is completely loaded with pallets of uncured blocks motor 47 is actuated to move rack 28 away from the space between arms 13 and 33 to the position of Figure 9. In this position rack 49 will be ready to receive pallets of uncured blocks from arms 13. During the loading of rack 49 two empty racks 53, 54 are transferred by a lift truck (not shown) onto carrier 44 in the spaces vacated by racks 50 and 51. These racks are empty in the sense that, after they have emerged from the curing chamber their cured blocks have been transferred to an unloading conveyor (by a mechanism not a part of the instant invention). However these racks still have retained thereon the pallets which previously supported the blocks.

Figure 10:
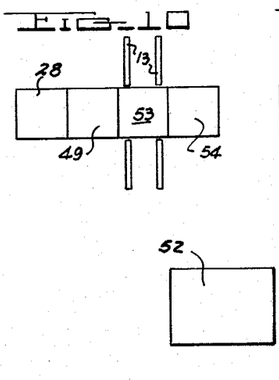

As soon as rack 49 is loaded with uncured blocks motor 47 is actuated to shift rack 53 into loading position in the space between arms 13 and 33 (as shown in Figure 10). During the loading of rack 53, racks 28 and 49, which at this time are loaded with uncured blocks, are transferred to curing chamber 52.

Figure 11:
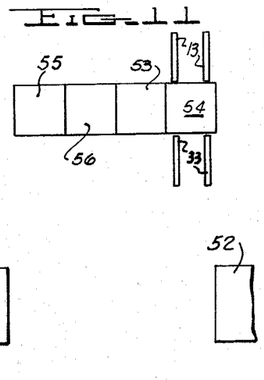

When rack 53 is loaded with uncured blocks motor 47 is again actuated, this time to shift rack 54 into loading position. During the loading of rack 54 two empty racks 55, 56 are moved by lift truck into the spaces vacated by racks 28 and 49.

From the position of Figure 11 carrier 44 is moved, by reverse actuation of motor 47, back into the Figure 8 position ready for loading of rack 55.

During the complete cycle of operations there will be put into motion at various times two hydraulic cylinders 18 and 37 and two electric motors 29 and 47. These cylinders and motors must operate reversibly, i. e., they must move in two directions. Means must therefor be provided for causing the cylinders and motors to operate for the desired time intervals and in the desired directions.

It is possible to control movements of cylinders 18 and 37 and motors 29 and 47 by hand operated switches. It is desirable, however, that means be provided for automatically controlling the movements. Most of the controlling can be accomplished with conventional limit switches, and/or control drums. The control of cylinder 18 (which causes the up and down motion of elevator 15) has however been found to be expeditiously accomplished by the mechanism shown in Figures 5, 6 and 7.

Figure 7:
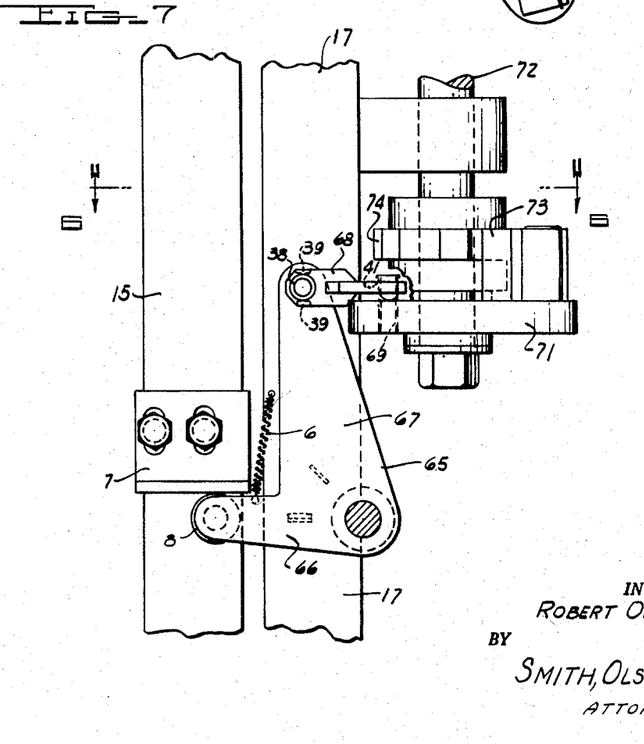
Figure 7 is an elevational view taken in the direction of arrow 7 in Figure 6.

The mechanism includes a vertically extending bell crank 65 urged upwardly from the position of Figure 7 by a tension spring 6. Arm 66 of crank 65 carries a roller 8 which lies in the path of angle iron 7 secured on elevator 15. Arm 67 of crank 65 pivotally carries a link 68 which is drilled through and countersunk at 9. The pivotal mounting for link 68 includes a flanged sleeve 38 which projects from arm 67 through opening 9. Link 68 is free to pivot around the axis of sleeve 38 in a plane parallel to arm 67 and the countersunk portions in opening 9 permit the link to additionally have a certain amount of movement at right angles to arm 67. A pair of half round portions 39 are secured on pawl 68 and prevent any binding between arm 67 and the link.

The free end of link 68 is drilled through and countersunk as at 41 for loosely receiving a flanged sleeve 69 which projects from an elongated arm 71. Sleeve 69 allows link 68 to pivot around its axis and the countersunk portions permit link 68 to additionally have a certain amount of movement around the axis of sleeve 38. A pair of half rounds 70 prevents any binding between link 68 and arm 71. Link 68 serves to translate movement of crank 65 into movement of arm 71.

Figure 6:
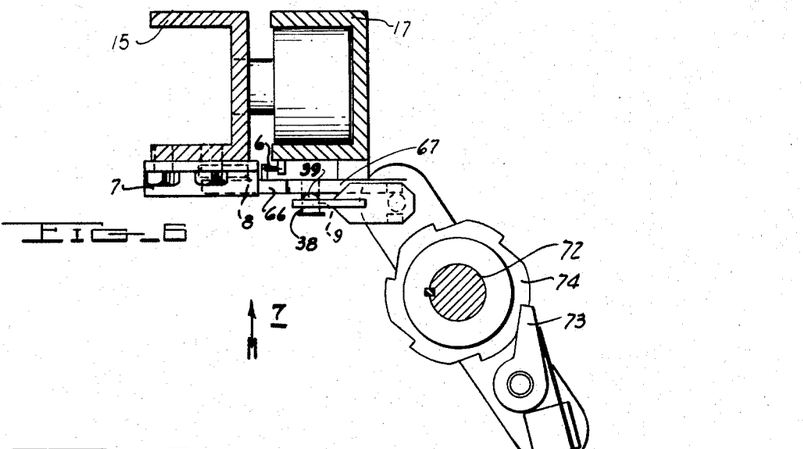
Figure 6 is a sectional view taken on line 6—6 in Figures 5 and 7.

Arm 71 is rotatably mounted on a vertical shaft 72 and carries a spring urged pawl 73 which engages the teeth of a ratchet 74 fixedly secured on shaft 72. It will be seen that as elevator 15 descends arm 7 will strike roller 8 on arm 66 and (through link 68) cause arm 71 to pivot around the axis of shaft 72. Pawl 73 will engage the teeth of ratchet 74 and thereby rotate shaft 72. When elevator 15 ascends crank 65 will rotate in a clockwise direction (as seen in Figure 7) and arm 71 will turn in a clockwise direction (as seen in Figure 6) to allow pawl 73 to slip over one of the teeth on ratchet 74 and thereby reset the pawl for further rotation of shaft 72 the next time elevator 15 descends. The dimensions and positions of the various arms and pawl-ratchet mechanisms are so chosen that each time the arm on elevator 15 descends into engagement with roller 8 shaft 72 will be rotated one-sixth of a revolution.

Figure 5:
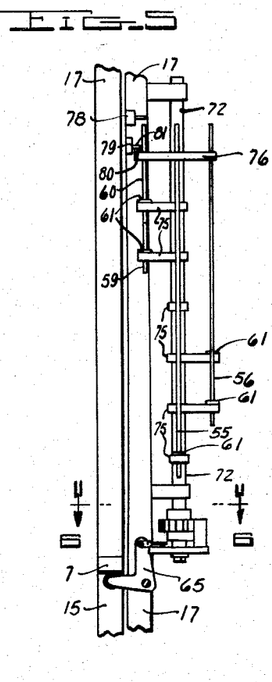
Figure 5 is a sectional view taken on line 5—5 in Figure 4.

Shaft 72 carries six apertured arms 75 at spaced positions along its length and a circular plate 76 adjacent its upper end (see Figure 5). Plate 76 has six apertures for slidably receiving the upper ends of six varying length rods numbered 55 through 60. Each arm 75 slidably receives the lower end of one of the rods and each rod carries a stop 61 for preventing downward movement of the rod through the arm. A limit switch 78 is positioned above plate 75.

The operation of elements is such that when elevator 15 reaches the upper limit of its travel (assuming it is desired to load the uppermost deck on rack 28), a projection 79 (Fig. 1) on the elevator will strike the lower end of rod 60. This rod will be moved upwardly and strike the actuating arm of limit switch 78. Switch 78 is in the circuit to the motor which controls movement of cylinder 18. Actuation of switch 78 will open its contacts and, therefore, cause cylinder 18 to be stopped with a consequent halting of elevator 15. It will be appreciated that the length of rod 60 is so chosen that elevator 15 will be stopped when arms 13 are in horizontal alignment with the top deck on rack 28.

After the top deck of the rack is loaded and as the elevator is moving carriage 14 down to a position where arms 13 are below conveyor 10, angle iron 7 on the elevator will strike roller 8 on arm 66 and thereby cause shaft 72 to move through one sixth of a revolution. This movement of shaft 72 causes rod 59 to be positioned in vertical registry with the actuating arm on limit switch 78. The rack is provided with six decks and the control mechanism is provided with six rods 55 through 60, so that each time the elevator descends a different one of the rods is positioned in vertical registry with the actuating arm on switch 78 and each time the elevator ascends arms 13 will be caused to be positioned in horizontal alignment with a different deck on the rack.

In addition to switch 78 there is also provided a switch 79 having an actuating arm 81 in horizontal registry with a projection 80 on the upper face of plate 76. Plate 76 will of course make one complete revolution during the loading of one rack. When a rack is completely loaded plate 76 will be rotated (by lowering movements of elevator 15) so as to bring projection 80 into engagement with arm 81 and thereby close the contacts through switch 79. This switch is in the circuit to motor 47 which controls movement of carrier 44. It will be recalled that the function of carrier 44 is to present a fresh rack in the space between arms 13 and 33 as each rack becomes loaded with pallets. Switch 79 insures that the carrier will be moved at the correct moment in the cycle. A reversing switch and delayed action limit switches (not shown) are provided on carrier 44 to reverse the connections to motor 47 and halt the carrier at the desired positions on tracks 46.

Figure 12:
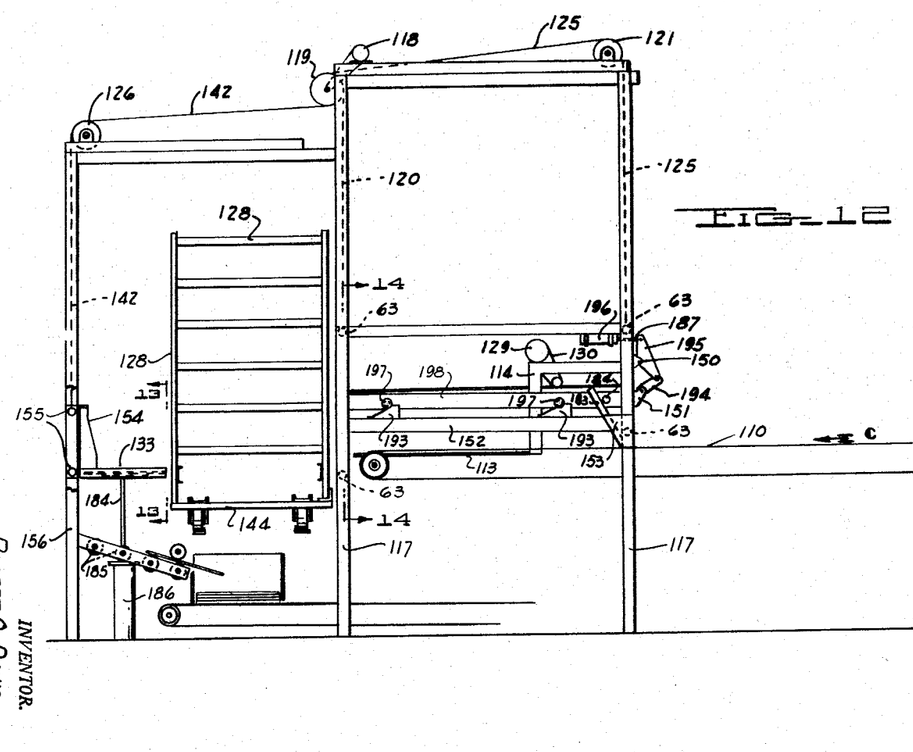
Figure 12 is a front elevational view of a second embodiment of the invention.
Figure 13:
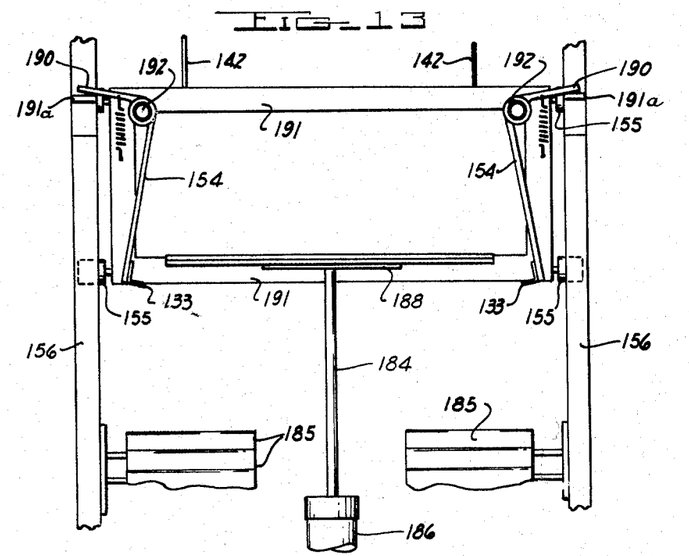
Figure 13 is a sectional view taken on line 13—13 in Figure 12.
Figure 14:
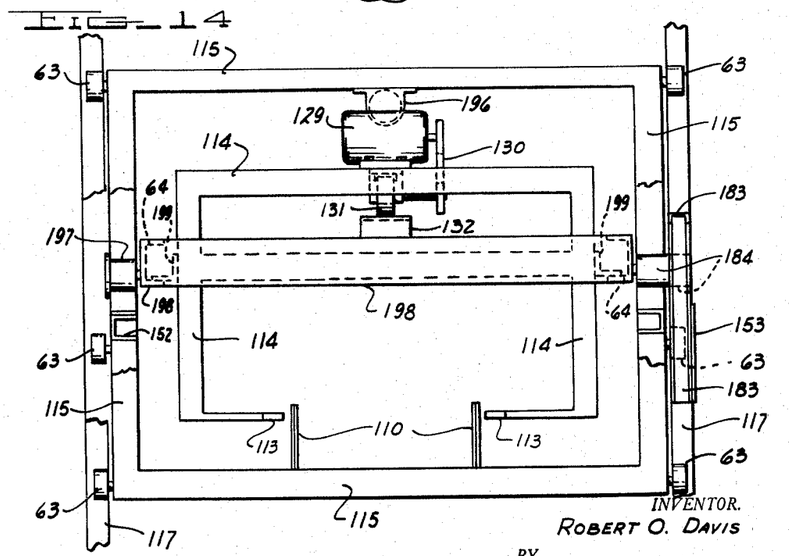

Reference is now made to the embodiment of the invention illustrated in Figures 12 through 14. The structure there shown will be seen to include a pallet conveyor 110. This conveyor moves in the direction of arrow C away from a molding machine (not shown). A carriage 114, having a pair of arms 113, is provided for lifting pallets from conveyor 110. Carriage 114 is equipped with a pair of slides 199 for its movable mounting on a pair of slides 64 formed integrally with a sub-carriage 198. Sub-carriage 198 is in turn provided with a plurality of rollers 197 for its movable mounting on an elevator 115. Elevator 115 has eight rollers 63 which allow it to be moved up and down on four vertical tracks 117 through actuation of a reversible electric motor 118. Rotary movement of motor 118 is translated into up and down movement of elevator 115 through the mechanism of pulleys 119, 121 and cables 120, 125. Pulleys 119 have anchorages thereon for retention of the upper ends of cables 120 and 125.

Upward movement of elevator 115 causes arms 113 to lift pallets from conveyor 110 and transfer them to positions in horizontal registry with any one of the decks on a rack 128. A reversible electric motor 129 is provided on carriage 114 for causing carriage 114 to move toward rack 128. Rotary movement of motor 129 is translated into straightline movement of carriage 114 by the mechanism of belt 130, pinion 131, and toothed rack 132 secured on sub-carriage 198. As the carriage moves toward rack 128 arms 113 strike empty pallets on the rack. These pallets are thereby pushed off the rack onto a pair of arms 133 formed as a part of an elevator 134. By lowering carriage 114 its is possible to transfer pallets from arms 113 to the adjacent deck of rack 128.

Lowering of carriage 114 is accomplished by a horizontally movable piston rod 187 extending from a hydraulic cylinder 196. Cylinder 196 is mounted on elevator 115. Movement of piston rod is controlled by a valve (not shown). This valve is actuated by a flexible cable (not shown), connected at one end to the valve and connected at its other end to carriage 114. When carriage 114 reaches a position such that arms 113 are within the confines of rack 128, a pull is exerted on the cable which is of sufficient magnitude to actuate valve 182 and thereby cause horizontal movement of piston rod 187. Horizontal movement of rod 187 is translated into vertical movement of arms 113 by the mechanism of a crank arm 195, a link element 194 and two pairs of inclined tracks 193. One end of arm 195 is pivotally connected to the piston rod 187, the center portion of arm 195 is pivotally connected to a bracket 150 secured on elevator 115, and the other end of arm 195 is pivotally connected to one end of link element 194. The other end of element 194 is pivotally connected to a bracket 151 secured on subcarriage 198. Inclined tracks 193 are secured on bars 152 which are formed as integral parts of elevator 115. Tracks 193 serve to guide rollers 197 in their movements.

When it is desired to lower arms 113 so as to deposit pallets of uncured blocks on a deck of rack 128 piston rod 187 will be caused (by actuation of the valve on cylinder 196) to move to the right (as viewed in Figure 12). Rightward movement of this piston causes a leftward movement of subcarriage 198. Rollers 197, which are mounted on subcarriage 198, roll down tracks 193 and thereby cause the subcarriage to be lowered with respect to elevator 115. Since carriage 114 rests on sub-carriage 198 it too will be lowered and arms 113 will thereby be caused to release pallets onto the deck of rack 128.

After arms 113 have deposited pallets on rack 128 motors 129 and 118 are actuated to return the arms to their initial positions beneath conveyor 110. As arms 113 reach their lowermost positions beneath conveyor 110 rollers 184, which are mounted on sub-carriage 198, strike inclined tracks 183 fixedly secured on two of tracks 117. As seen in Fig. 14 tracks 183 are formed out of channel bars and securely held in place on tracks 117 by two flat plates 153. Movement of rollers 184 down tracks 183 causes rollers 197 on sub-carriage 198 to ride up on tracks 193. Piston rod 187 moves into cylinder 196 so as to reset itself for further movement at the time when it is desired to again lower arms 113 relative to elevator 115. It will be appreciated that the horizontal and vertical movements of the carriage and elevator are repeated until all the decks of rack 128 are loaded with pallets of uncured blocks, after which another rack is moved into position for being loaded.

It will be recalled that when arms 113 are moving toward rack 128 they cause pallets of cured blocks to be pushed off the rack onto a pair of arms 133. Each of arms 133 is fixedly secured to a plate 154 which is pivotally connected at 192 to a rectangular frame 191. This frame mounts four rollers 155 which guide it for vertical movement between two tracks 156. The upper end of frame 191 has secured thereto a pair of cables 142. These cables run up over a pair of pulleys 126 to an anchorage on certain of pulleys 119. Pulleys 119 and their associated cables 120, 125 and 142 provide a mechanism for causing simultaneous up and down movement of elevators 115 and 134.

As elevator 134 reaches the lower limit of its travel lugs 190 (which extend from plates 154) strike fixed projections 191a, thereby causing plates 154 to pivot about pivots 192 so as to allow pallet-supporting arms 133 to be released from engagement with the pallets. The pallets are released onto a flat plate 188 which is secured on the upper end of a piston rod 184 extending from an air cylinder 186. Movement of elevator 134 to the lower limit of its travel actuates a switch (not shown) which causes piston rod 184 to move down into cylinder 186. When rod 184 reaches the limit of its downward movement the pallets are deposited onto a series of rollers 185. These rollers allow the pallets to gravitate down onto a chain conveyor 143 which returns them to molding machine 111. In the embodiment of the invention now under discussion cylinder 186 has the same function as cylinder 37 in the previously discussed embodiment.

The mechanism for moving rack 128 into and out of position between arms 113 and 133 includes a carrier 144. The operation of carrier 144 is the same as the previously outlined operation of carrier 44. Therefore, a second description of the carrier operation is not included here. The control mechanism for the electric motors may be the same as that used with the previous embodiment of the invention. Hence a second description of the control mechanism is not included here.

Attention is now directed to Figures 15 through 18 wherein is shown diagrammatically another embodiment of the invention. The loading elevator, carriage and rack members utilized in this embodiment may be constructed as shown in Figures 1 through 4 or Figures 12 through 14.

If the elevator, carriage and rack members are constructed as shown in Figures 1 through 4 it is possible to omit cylinder 37, since in the instant embodiment arms 33 need never be positioned below the level of arms 13. Cables 142 can be anchored on cross bar 22.

If the elevator, carriage and rack members are constructed as shown in Figures 12 through 14 cylinder 186 can be omitted but arms 133 must be lengthened to correspond with the length of the angle irons (or deck-forming members) on rack 128. The object in making the arms longer is to accommodate pallets in side by side relation instead of in superimposed relation. It is possible by employing the elements as shown in Figures 15 through 18 to empty one rack of cured blocks while simultaneously loading the rack with uncured blocks. This concept may best be understood by further reference to Figure 1 wherein a chain conveyor 148 is shown in dotted lines. Conveyor 148 will be employed in lieu of conveyor 43, and, as stated previously arms 33 will at no time be positioned below the level of arms 13.

Operation of the elements may best be understood by reference to Figures 15 through 18 wherein for illustration purposes the racks are numbered 28, 49, 50 and 51.

Figure 15:
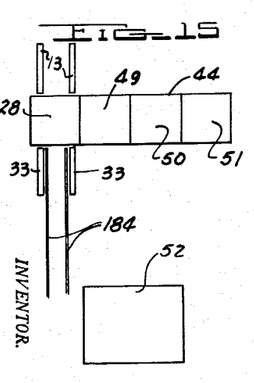
Figures 15 through 18 are diagrammatic views showing certain elements of the invention in positions they occupy at different periods during the cycle of operations.

In Figure 15 rack 28 is receiving pallets of uncured blocks from arms 13 and discharging pallets of cured blocks onto arms 33. As arms 33 receive blocks they are lowered toward chain conveyor 148 which subsequently carries the pallets of cured blocks to a storage area preparatory to their being shipped out of the block manufacturing plant.

While blocks are being transferred to and from rack 28, racks 50 and 51 are being transferred from carrier 44 to curing chamber 52 for curing of blocks.

Figure 16:
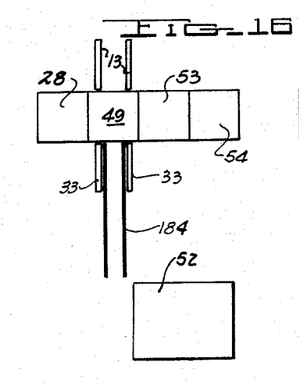

In the Figure 16 position rack 49 receives pallets of uncured blocks from arms 13 and discharges pallets of cured blocks onto arms 33. During this time two racks (53 and 54) of cured blocks are being transferred by lift truck from the curing chamber to the positions on carrier 44 vacated by racks 50 and 51.

Figure 17:
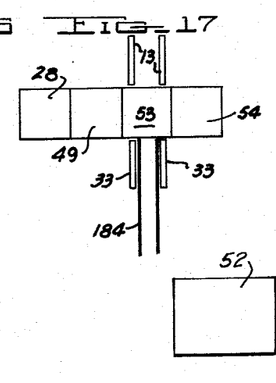

In the Figure 17 position rack 53 receives pallets of uncured blocks and discharges pallets of cured blocks. During this time racks 28 and 49 are being transferred from carrier 44 to the curing chamber.

Figure 18:
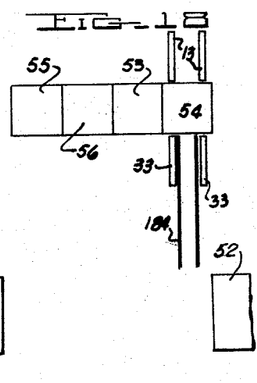

From the position of Figure 17 carrier 44 is moved to the Figure 18 position, where rack 54 can be loaded with uncured blocks while at the same time discharging cured blocks. During this time two racks (55 and 56) of cured blocks will be transferred from the curing chamber to the positions on carrier 44 vacated by racks 29 and 49.

From the positions of Figure 18 the carrier is moved back to the position of Figure 15 thereby resetting the elements for another cycle of operation.

The various embodiments of the invention are considered advantageous in that arms 13 (or 113) provide a mechanism for simultaneously loading and unloading the racks. Carrier 44 (or 144) provides a mechanism for automatically replacing racks at the completion of the loading operation. Arms 33 (or 133) provide a mechanism for automatically transferring empty pallets or pallets of cured blocks from vertically spaced positions on the racks to positions on a horizontally movable conveyor.

It is contemplated that certain of the elements could be interchanged. Thus elevator 34 could replace elevator 134 and cylinder 37 could replace cylinder 186 in the embodiment illustrated in Figures 12 through 14. The various structural arrangements which may be employed are set forth in the following claims:

I claim:

1. Pallet transfer mechanism comprising first and second conveyors; a carrier between said conveyors movable horizontally at right angles to the first conveyor; a plurality of multi-deck racks removably positioned on said carrier; a first elevator positioned adjacent said first conveyor; a horizontally movable carriage on said elevator, said carriage having a pallet-engaging arm positionable beneath the path of pallets on the first conveyor; a second elevator positioned adjacent said second conveyor; and means for simultaneously moving said elevators; whereby (1) the elevators are caused to ascend until pallets have been transferred from the conveyor to the arm, the transferred pallets are above but spaced laterally from one of the decks on the rack, and the second elevator is slightly below but laterally from said one deck, (2) the carriage is moved laterally so as to push pallets from said one deck onto the second elevator and position the transferred pallets above said one deck, (3) the carriage descends until the transferred pallets are supported entirely on said one deck, (4) the carriage is moved laterally out of vertical registry with the rack, and (5) the elevators descend simultaneously so as to position the arm beneath the path of pallets on the first conveyor and deposit pallets from the second elevator onto the second conveyor.

2. The combination of claim 1 and further including mechanical means operable at completion of the pallet-loading operation to move the carrier so as to position an empty rack in the space previously occupied by the loaded rack.

3. The combination of claim 1 wherein the means for simultaneously moving the elevators comprises a series of sheaves positioned above the level of the elevators; first flexible force-transmitting elements extending from the first elevator up and over some of the sheaves; second flexible force-transmitting elements extending from the second elevator up and over others of the sheaves; a cross bar interconnecting the free ends of said second flexible elements; first power means acting to move the sheaves; and second power means acting to move the cross bar; whereby the second elevator enjoys a greater range of movement than the first elevator so as to permit positionment of the second conveyor below the level of the first conveyor.

4. The combination of claim 1 wherein the means for simultaneously moving the elevators comprises a series of sheaves positioned above the level of the elevators; first flexible elements extending from the first elevator up to and over some of the sheaves; second flexible elements extending from the second elevator up and over others of the sheaves; and a single power means for rotating all of the sheaves as a unit so as to effect a simultaneous raising and lowering of the two elevators.

5. The combination of claim 1 wherein the second conveyor is positioned below the level of the first conveyor; the combination further including a vertically movable pallet-engaging member positioned in the path of the second elevator, said second elevator including a frame structure and two pallet-supporting members pivotally mounted on said frame structure; and fixed abutment means in the path of said pallet-supporting members; whereby as the second elevator descends toward the lower limit of its travel the pallet-supporting members strike the fixed abutment means so as to thereby pivot outwardly from positions engaging the undersides of the pallets and allow the pallets to be supported on the pallet-engaging member, after which the pallet-engaging member is caused to move downwardly so as to put the pallets on the second conveyor.

6. The combination of claim 1 wherein a sub-carriage is positioned between the carriage and elevator; there being inclined guide means between the sub-carriage and elevator, and power means between said elevator and sub-carriage for moving the sub-carriage in the direction dictated by the inclined guide means; whereby pallets may be transferred from the carriage arm to said one deck by declining movement of the sub-carriage in the aforementioned direction.

7. Pallet handling equipment for inserting block-loaded pallets from a block forming machine into multi-deck racks for transfer to a curing chamber and for removing empty pallets of a previous cycle of operation from said multi-deck racks for return to said block forming machine, said equipment comprising first and second conveyors, a carrier operably positioned between the discharge and receiving ends respectively of said conveyors and movable horizontally at substantially right angles to the first conveyor, a plurality of multi-deck racks positioned on said carrier, a first elevator positioned at the discharge end of said first conveyor, a horizontally movably carriage on said elevator, said carriage having a pallet-engaging arm positionable beneath the path of pallets on the first conveyor and adapted to be advanced into said racks for depositing loaded pallets on the decks thereof, a second elevator positioned at the receiving end of said second conveyor, and means synchronizing the raising and lowering operation of said elevators so that they will ascend to and descend from the same deck of a rack so that when a loaded pallet is transferred from the first elevator to a paraticular deck an empty pallet from a previous cycle of operation can be moved from that deck onto said second elevator to be lowered for transfer to the receiving end of said second conveyor.

8. Pallet handling equipment for inserting block-loaded pallets from a block forming machine into multi-deck racks for transfer to a curing chamber and for removing empty pallets of a previous cycle of operation from said multi-deck racks for return to said block forming machine, said equipment comprising first and second conveyors, a carrier operably positioned between the discharge and receiving ends respectively of said conveyors and movable horizontally at substantially right angles to the first conveyor, a plurality of multi-deck racks positioned on said carrier, a first elevator positioned at the discharge end of said first conveyor, a horizontally movable carriage on said elevator, said carriage having a pallet-engaging arm positionable beneath the path of pallets on the first conveyor and adapted to be advanced into said racks for depositing loaded pallets on the decks thereof, a second elevator positioned at the receiving end of said second conveyor, means synchronizing the raising and lowering operation of said elevators so that they will ascend to and descend from the same deck of a rack so that when a loaded pallet is transferred from the first elevator to a particular deck and an empty pallet from a previous cycle of operation can be moved from that deck onto said second elevator to be lowered for transfer to the receiving end of said second conveyor, and additional control means for automatically stopping the elevators at a different deck each time they are raised thereby loading each deck of a rack with an uncured block.

9. Pallet handling equipment for inserting block-loaded pallets from a block forming machine into multi-deck racks for transfer to a curing chamber and for removing empty pallets of a previous cycle of operation from said multi-deck racks for return to said block forming machine, said equipment comprising first and second conveyors, a carrier operably positioned between the discharge and receiving ends respectively of said conveyors and movable horizontally at substantially right angles to the first conveyor, a plurality of multi-deck racks positioned on said carrier in side-by-side relation, a first elevator positioned at the discharge end of said first conveyor, a horizontally movable carriage on said elevator, said carriage having a pallet-engaging arm positionable beneath the path of pallets on the first conveyor and adapted to be advanced into said racks for depositing loaded pallets on the decks thereof, a second elevator positioned at the receiving end of said second conveyor, control means synchronizing the raising and lowering operation of said elevators so that they will ascend to and descend from the same deck of a rack enabling a loaded pallet to be transferred from the first elevator to a particular deck and an empty pallet from a previous cycle of operation can be moved from that deck onto said second elevator to be lowered for transfer to the receiving end of said second conveyor, other control means for automatically stopping the elevators at a different deck each time they are raised thereby loading each deck of a rack with an uncured block, and additional control means for moving said carrier when said rack is filled with uncured blocks to a new position with another rack in position to be loaded.

References Cited in the file of this patent
UNITED STATES PATENTS

| | | |
|---|---|---|
| 657,371 | Webre | Sept. 4, 1900 |
| 1,332,168 | Dickson | Feb. 24, 1920 |
| 1,490,076 | Luce | Apr. 8, 1924 |
| 1,606,477 | McClelland | Nov. 9, 1926 |
| 1,779,210 | Davis | Oct. 21, 1930 |
| 1,783,363 | Grob | Dec. 2, 1930 |
| 2,061,495 | Woodruff | Nov. 17, 1936 |
| 2,177,941 | Knudson et al. | Oct. 31, 1939 |
| 2,502,940 | Gelbman | Apr. 4, 1950 |
| 2,510,573 | Gray | June 6, 1950 |
| 2,535,961 | Schutt | Dec. 26, 1950 |
| 2,609,110 | Tesch | Sept. 2, 1952 |
| 2,612,275 | Chapman | Sept. 30, 1952 |
| 2,624,470 | Geist | Jan. 6, 1953 |
| 2,647,647 | Alimanestiano | Aug. 4, 1953 |
| 2,661,100 | Ashford | Dec. 1, 1953 |
| 2,679,323 | Patterson | May 25, 1954 |
| 2,728,468 | Siempelkamp | Dec. 27, 1955 |

FOREIGN PATENTS

| | | |
|---|---|---|
| 624,271 | Great Britain | June 1, 1949 |